Figure 1:
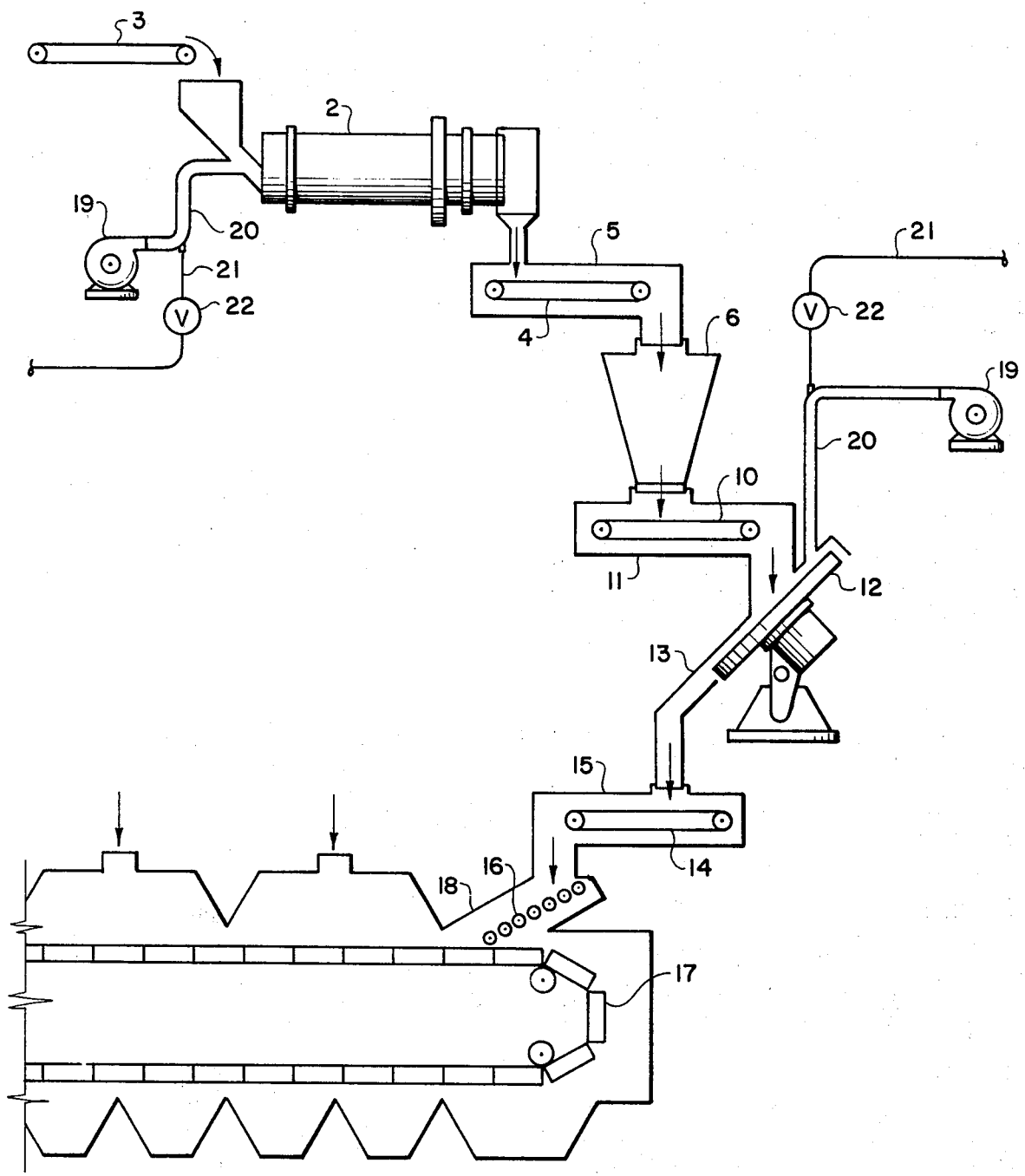

United States Patent [19]
Malcolm

[11] 3,894,344
[45] July 15, 1975

[54] METHOD AND APPARATUS FOR DRYING MATERIALS IN FIXED BEDS

[75] Inventor: Donald B. Malcolm, Pittsburgh, Pa.

[73] Assignee: Dravo Corporation, Pittsburgh, Pa.

[22] Filed: Jan. 22, 1974

[21] Appl. No.: 435,433

[52] U.S. Cl. .............................. 34/12; 34/60; 34/61
[51] Int. Cl.² .......................................... F26B 7/00
[58] Field of Search ................... 34/12, 60, 61; 75/3

[56] References Cited
UNITED STATES PATENTS

| | | | |
|---|---|---|---|
| 2,287,663 | 6/1942 | Brassert | 75/3 |
| 2,766,109 | 10/1956 | Komarek et al. | 75/3 |
| 2,812,591 | 11/1957 | Kling | 34/12 |
| 3,539,336 | 10/1970 | Urich | 75/3 |
| 3,664,033 | 5/1972 | Fritze | 34/12 |
| 3,671,027 | 6/1972 | Frans | 75/3 |

*Primary Examiner*—John J. Camby
*Attorney, Agent, or Firm*—Parmelee, Miller, Welsh & Kratz

[57] ABSTRACT

Condensation which occurs in a bed of ore on a traveling grate for sintering, or a bed of agglomerates, such as pellets, on a traveling grate in the process of heat-hardening them, which occurs when drying and preheating air first flows through the bed is reduced if not eliminated by conserving heat contained in the fines or imparted to the fines during their preparation, such as grinding, or from the drying of filter cake comprised of such fines, and even further augmenting this heat to increase the temperature of the fines or make up for loss which occurs before the fines or agglomerates are loaded onto the grate whereby the charge on the grate is already warm before the current of drying air flows through it.

14 Claims, 2 Drawing Figures

METHOD AND APPARATUS FOR DRYING MATERIALS IN FIXED BEDS

This invention is for a method of and apparatus for the drying of materials in a fixed bed where the material being dried or the permeability of the bed to the passage of gases therethrough may be impaired by the condensation of moisture carried by warm gases from one part of the bed into subsequent contact with cooler material in another part of the bed.

The invention is particularly applicable to the processing of ore concentrates and other minerals either as particulate material or as agglomerates for sintering such material or heatindurating the agglomerates on traveling grates or similar apparatus, and will be hereinafter specifically described in connection with sintering and indurating operations, but without exclusion of other processes.

In the processes involving the drying of materials in fixed beds, as in sintering of raw materials on a traveling grate or the indurating or firing of pellets or other aggolmerates, the material being processed, whether particles or agglomerates, are charged into some apparatus in which they are retained in a fixed bed through which progressively hotter gases are forced to bring the material up to sintering or indurating temperature. In such processes the fixed bed must be permeable to the flow of heated air or gases therethrough and the development of areas or zones of low permeability will result in those areas being inadequately heated while there may be overfiring in other areas where the gases move freely or "channel" their way through the bed.

The throughout of a traveling grate or similar apparatus is generally at the optimum where the depth of the bed is at a maximum provided that for practical purposes the permeability to the flow of gases therethrough is substantially uniform over the entire area of the bed.

In many cases the particulate material constituting the sinter bed will contain moisture, and in the case where the material is pelletized or otherwise agglomerated, water is used in forming the fines into pellets or other agglomerates. As heated gases first permeate the bed, flowing from the top down (downdraft) or from the bottom up (updraft) the heated gases will evaporate water from the material which they first contact, as for example, the upper portion of the bed in downdraft flow of gases, to a point of saturation while yielding heat to the uppermost material in the bed. These saturated gases continuing down through the bed encounter the yet unheated and therefore cooler material and, being cooled thereby, are unable to retain all of the moisture acquired in the upper levels of the bed, and deposit it as condensate on this cooler material. This causes an overwetting of the material in the bed, which may cause agglomerates to become weak and plastic, and in such case, as well as with particulate material, result in the development of a slurry that reduces the permeability of the bed to the continued flow of gases therethrough.

More specifically, in the case of pellets, this condensation may occur to an extent where the green pellets will weaken and collapse, shatter or crack apart under the weight of the overlying pellets, closing or partly closing the voids through which the gases must travel and restricting permeability. Also, as with particulate material, the increased moisture will mix with fines or wash fines from the surface of the pellets and form a slurry that will fill the voids in the bed and may bond clusters of pellets together, thereby reducing permeability of the bed.

It has been proposed to preheat pellets in shallow beds beore charging them into a deeper bed on the traveling grate or other apparatus, and at the same time prevent drying of the green pellets, since premature drying may make the green pellets too weak for subsequent loading into a deep bed. Such procedure is disclosed for example in Shuster U.S. Pat. No. 3,319,346. For certain reasons, including cost of equipment and operating expense, the adoption of such a procedure has been discouraged.

BRIEF STATEMENT OF THE PRESENT INVENTION

In the preparation of certain materials either for sintering, or for the formation of agglomerates, such as pellets, for subsequent firing in a deep bed, the preparation of the material commonly results in its being heated. For example, in the grinding of ore concentrates or other coarse material for the production of fines, the material as discharged from the grinding mill may be quite hot. In other processes filter cake comprising the material to be processed must be dried in a heated drier from which the particulate material or fines are discharged in a heated condition.

According to this invention the heat generated in or imparted to the ore or other material being processed is conserved, and heat may be supplied either for heating material which otherwise could be cold or at ambient temperature, or heat may be additionally supplied to the material which has become heated to offset heat losses in subsequent steps or merely to increase its temperature before the material is placed in a fixed bed for processing.

For example, material which is discharged hot from heat generated in the process of grinding is conveyed through a closed environment and discharged hot onto a pelletizing disk or other agglomerating apparatus which is also in an enclosure where heat is conserved. The formed pellets or other agglomerates are then carried through heat conserving enclosures to an enclosed traveling grate pellet loading apparatus which loads them onto the receiving end of a traveling grate or other apparatus where they accumulate in a bed while they are still at a temperature above the prevailing ambient temperature. Consequently as the bed of pellets are carried into the drying zone of the indurating apparatus, the average temperature of the pellets is such that the drying gases are cooled less by contact with the pellets, and therefore less of the initially evaporated moisture is condensed in the bed of pellets and the pellets are not weakened and difficulties due to the redeposition of moisture in another level of the bed is reduced or eliminated. The green pellets or other agglomerates therefore are not weakened by premature loss of moisture before they are finally placed in the bed. Heat which would otherwise be lost is conserved, so that the heat input into the bed at the beginning of the operation is reduced.

The same procedure follows in a process where the ore or other fines comprise a wet mass, such as a filter cake, where the filter cake is dried in a heated dryer before the fines can be pelletized or re-agglomerated into compacts for further processing on a traveling grate or other indurating equipment. The heated fines are transferred through enclosures to an enclosed pelletizing or other agglomerating apparatus where enough water is supplied to effect the bonding or agglomeration of fines into pellets or other formed bodies. This apparatus is enclosed in heat, and moisture retaining enclosures and the resulting bodies are then transferred through an enclosure and deposited while retaining much of the heat from the drying step into a bed, forming a bed where the average temperature of the bed is higher than would otherwise be the case.

Where it is found desirable, added heat with or without additional steam to retard evaporation of moisture may be additionally supplied to the enclosure.

Even where the concentrates or other material are not agglomerated but are deposited as a sinter bed ingredient, usually combined with a fuel, they may have sufficient moisture to result in condensation in the bed as above described, so that it is desirable to retain in the concentrates heat which they acquire in some processing stage by transferring the material through enclosures from the source where it acquires heat until it is deposited on the sintering strand, and even apply additional heat thereto to assure that it is above ambient temperature.

Figure 2:
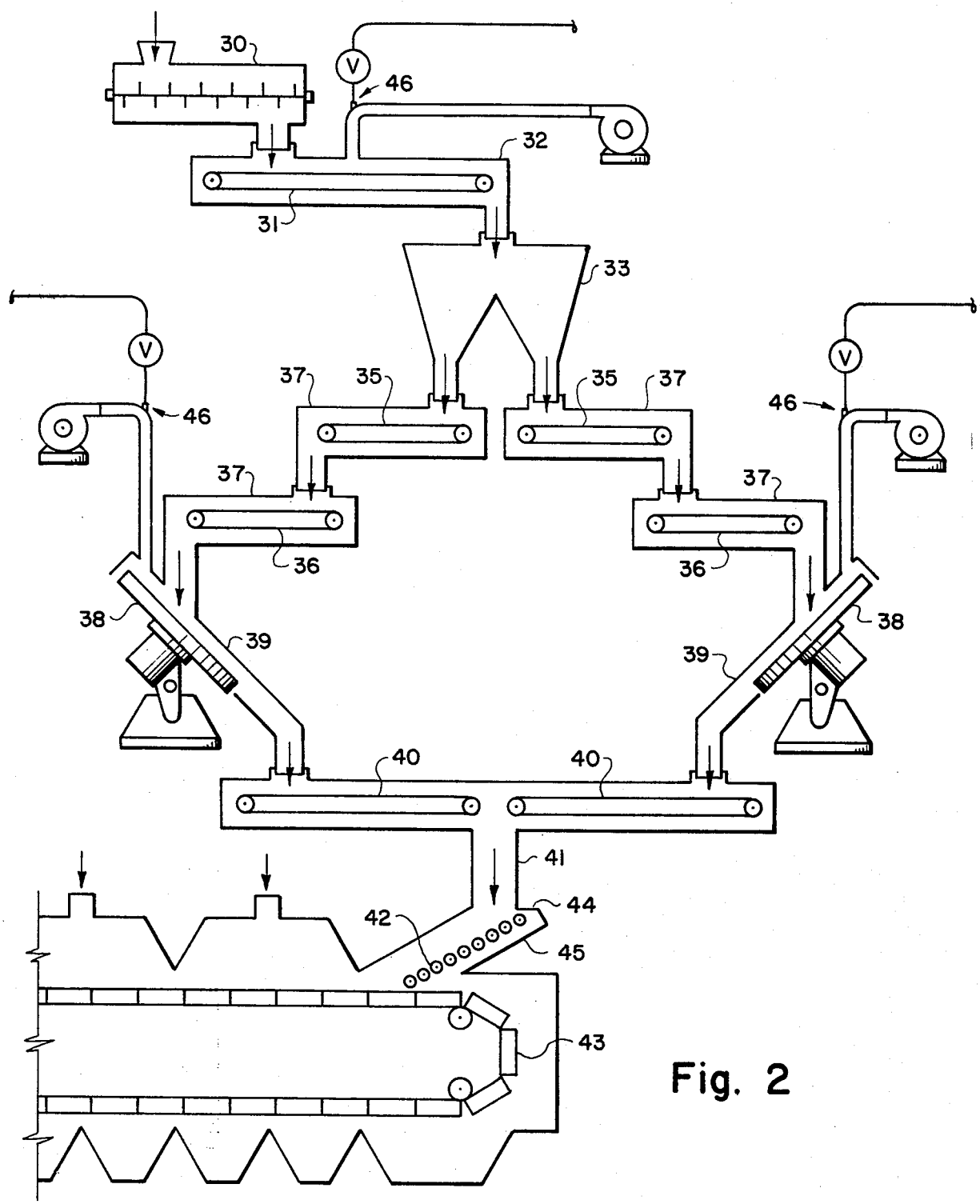

The invention may be more fully understood in connection with the accompanying drawings wherein:

FIG. 1 is a schematic flow diagram of a process where the material is pelletized after grinding and then deposited on traveling grate indurating apparatus and heat generated in grinding is conserved in the material from the mill where the material is ground until the green pellets are deposited in a bed on the grate; and FIG. 2 is a similar diagram where the fines acquire heat from a drying operation, as where the material is a filter cake that is first dried or partially dried.

Referring first to FIG. 1 of the drawing, 2 designates a grinding mill into which the ore or mineral to be processed is delivered by a conveyor 3. The grinding necessarily heats the resulting fine material. The ground material is discharged onto a conveyor 4 about which is a heat-retaining enclosure 5. It dicharges material into a hopper 6 or bin which is also enclosed and insulated. The hopper discharges the fines onto a feeder 10 which carries the material through an enclosure 11 to a pelletizing or agglomerating apparatus 12, such as a pelletizing disk. On the pelletizing apparatus or other agglomerating apparatus moisture is supplied to the fines to effect the bonding of the fines into pellets or other formed bodies, as is well understood in the art. This apparatus is enclosed in a heat-retaining enclosure 13. The formed pellets or agglomerates are transferred on a conveyor 14 in an enclosure 15 to feeder 16 that deposits them in a bed on the traveling grate apparatus, the receiving end of which is indicated at 17. The feeder 16 is also preferably in an enclosure 18.

Thus it will be seen that heat imparted to the material in its preparation for final discharge into a fixed bed is conserved so that the pellets are deposited in a bed at an elevated temperature, but under conditions where drying of the material or pellets which would result in significant adiabatic cooling does not take place. Also premature drying of the fines or the pellets is prevented, with perhaps some saving of fuel.

In order to retard heat loss and even supply additional heat, warm humidified air, steam or water vapor may be introduced into the system at one or more places to retard evaporation of moisture with resultant cooling and to also maintain a positive pressure in the system to retard the influx of ambient air. Means for accomplishing this is indicated at two locations, and such means are here illustrated, comprises a blower 19 with a discharge duct 20 opening into the system while a steam pipe 21 with a control valve 22 from a boiler, not shown, discharges steam into the duct 20 to moderately heat the air and humidify. One such arrangement is here illustrated for supplying warm humid air to the mill enclosure and one to the pelletizing enclosure, but this is for purpose of illustration and such means could be elsewhere, or one unit for this purpose may be adequate, or additional ones provided.

FIG. 2 illustrates my invention applied to a plant where wet fines, such as filter cake, is dried or partially dried in a heated agitating thermal dryer 30. The heated dried or partially dried fines or concentrates from the dryer are discharged onto a conveyor 31 in an enclosure 32 and discharged from this conveyor into a receiving insulated hopper 33. From here on the apparatus is essentially the same as in FIG. 1, except for purposes of illustration more than one pelletizing apparatus or other agglomerating means is supplied from the hopper 33, as may be necessary where the output of the drier, or in the case of a grinding mill as in FIG. 1, is greater than the capacity of a single pelletizer to process the output, and it is undesirable to accumulate large amounts of material in the hopper 33. As here diagramed, the hopper 33 discharges on a conveyor system which supplies two, and there could be more, pelletizing or agglomerating units. This system as here illustrated comprises two conveyor units 35 discharging onto pelletizing disk feeders 36. Each conveyor-feed 35-36 is enclosed in a heat-retaining enclosure 37. The pelletizing or agglomerating apparatus indicated by two pelletizing disks 38 are enclosed. In pelletizing or otherwise agglomerating, as explained above, water may be supplied to the fine material. The units 38 are enclosed, as indicated at 39. The agglomerates are carried through enclosed conveyors 40 to a receiving hopper 41, and discharged onto a grate feeding device 42 which loads the pellets or other agglomerates onto the receiving end of a traveling grate apparatus 43. The hopper 41 and conveyors 42 are enclosed, as indicated at 44 and 45.

In both systems, that is in FIG. 1 and FIG. 2, the enclosures are in continuous communication, providing in effect one continuous enclosed heat-retaining environment through which the material moves. As a matter of fact the entire plant might comprise a succession of communicating rooms or even a single large enclosure arranged to conserve the heat generated in or imparted to the material in a preliminary stage until the material is loaded into the fixed bed in which it is to be processed. The multiple arrangement of FIG. 2 may of course be used in FIG. 1, and the single pelletizer system of FIG. 1 is applicable to the method of FIG. 2. Humidified warm air supplying means such as blower heater units similar to those shown in FIG. 1 are indicated at 46.

Where the particulate material is to be charged without agglomeration into a bed, perhaps admixed with fuel for sintering the pelletizing or other agglomerating apparatus is omitted, but with hoppers, conveyors and feeders enclosed as in FIGS. 1 and 2 to conserve heat and prevent excessive drying, and of course moist heated air may be supplied as described in FIGS. 1 and 2 to maintain a positive pressure in the enclosure, and make up for heat loss or supply added heat. In some cases, the fine material entering the system may be cold or at ambient temperature, in which case the blower-heater units raise its temperature, even before agglomeration and the enclosure in any case significantly retards adiabatic cooling. In some ore processing locations, ambient temperature may well be over 100°F., in which case adiabatic cooling could undesirably lower the temperature of the material below the ambient temperature, so that the enclosed system may be important whether or not other heat is supplied to the ore.

I claim:

1. In the process of drying a moist, heated particulate material in a fixed bed for further processing wherein the material becomes heated during the preparation of the material for such drying and processing, the step which comprises conserving the heat and moisture contained in the material, after its preparation until it is deposited in a fixed bed to be then dried by transferring the material from the apparatus in which it is prepared to the fixed bed through an enclosure which conserves heat in the material and also prevents adiabatic cooling resulting from evaporation of moisture therefrom through contact with a drying atmosphere during such transfer.

2. In the process defined in claim 1, the further step of supplying additional heat and moisture to the material while it is being so transferred through said enclosure.

3. The process defined in claim 2 wherein the additional heat so supplied is more than sufficient to offset loss of heat and moisture from the material which would otherwise occur but is also sufficient to increase the temperature thereof while avoiding drying of the material.

4. In the process defined in claim 1, the further step of forming the material into agglomerates while it is being so transferred through the enclosure.

5. In the process defined in claim 1, the further step of rolling the warm moisture particulate material into pellets in the course of being transferred through the enclosure.

6. The method defined in claim 1 in which the heat acquired in the preparation of the material results from grinding basic raw material into fines.

7. The method defined in claim 1 in which the heat is acquired in the preparation of the material by the removal of at least some of the moisture in the material in a heated dryer.

8. The method defined in claim 1 in which a heated moist atmosphere is maintained in the enclosure at above atmospheric pressure to prevent ingress of surrounding air.

9. In a mineral processing apparatus for drying heated moist particles wherein there is provided a means for preparing the particles to be processed, the operation of which discharges the particles in a heated moist condition and wherein there is a grate to which the moist particles are to be delivered and on which they are dried in a fixed bed with means for circulating heated air through the material on the grate, the invention comprising:

a. a transfer system for continuously transferring the particles from said preparing means to the grate having a receiving end positioned to receive the moist heated particles from said preparing means and a discharge end arranged to discharge the material directly onto the grate, a heat-conserving enclosure for the transfer system extending from end to end of said system, and b. means for maintaining a controlled moist atmosphere in the enclosure to protect the material against adiabatic cooling during its transfer from the receiving end of the system to the discharge end.

10. The invention defined in claim 9 in which said transfer system particles into formed agglomerates which are then discharged onto the grate.

11. The invention defined in claim 10 in which said means for agglomerating the fines comprises a pelletizing disk.

12. The invention defined in claim 9 wherein means is provided for introducing combined heated air and moisture into said enclosure.

13. The invention defined in claim 9 wherein said transfer system comprises within the enclosure between the inlet and discharge ends:

a. a pelletizer;
b. means for delivering heated moist particles from the receiving end to the pelletizer;
c. a feeder at the discharge end of the enclosure for delivering pellets onto the grate;
d. means for receiving pellets from the pelletizer and transferring them to the feeder, and
e. means for supplying heat and moisture to the enclosure for heating the particles and the pellets and retarding evaporation of moisture.

14. The invention defined in claim 13 wherein said last-named means comprises means for maintaining the atmosphere in the enclosure above atmospheric pressure.

* * * * *